United States Patent [19]
Holbrook

[11] Patent Number: 5,859,367
[45] Date of Patent: Jan. 12, 1999

[54] METHOD FOR DETERMINING SEDIMENTARY ROCK PORE PRESSURE CAUSED BY EFFECTIVE STRESS UNLOADING

[75] Inventor: Philip W. Holbrook, Houston, Tex.

[73] Assignee: Baroid Technology, Inc., Houston, Tex.

[21] Appl. No.: 848,768

[22] Filed: May 1, 1997

[51] Int. Cl.$^6$ .............................. G01V 1/40; G01R 1/28; F21B 49/00

[52] U.S. Cl. ..................... 73/152.05; 73/794; 73/152.52; 73/784; 166/250; 175/40; 364/422

[58] Field of Search .......................... 73/152.05, 152.09, 73/152.41, 152.51, 152.52; 166/250; 175/40; 364/422

[56] References Cited

U.S. PATENT DOCUMENTS

| | | | |
|---|---|---|---|
| 4,811,597 | 3/1989 | Hebel | 73/151 |
| 4,833,914 | 5/1989 | Rasmus | 73/152 |
| 4,884,438 | 12/1989 | Jones et al. | 73/152 |
| 4,890,487 | 1/1990 | Dussan et al. | 73/152 |
| 4,961,343 | 10/1990 | Boone | 73/152 |
| 4,981,037 | 1/1991 | Holbrook et al. | 73/152 |
| 5,081,612 | 1/1992 | Scott et al. | 367/38 |
| 5,130,949 | 7/1992 | Kan et al. | 367/27 |
| 5,142,471 | 8/1992 | Desbrandes | 364/422 |
| 5,200,929 | 4/1993 | Bowers | 367/38 |
| 5,226,310 | 7/1993 | Steiger | 73/38 |
| 5,233,568 | 8/1993 | Kan et al. | 367/27 |
| 5,282,384 | 2/1994 | Holbrook | 73/152 |
| 5,442,950 | 8/1995 | Unalmiser et al. | 73/38 |
| 5,703,286 | 12/1997 | Proett et al. | 73/152.05 |

FOREIGN PATENT DOCUMENTS 2174201 10/1986 United Kingdom .

OTHER PUBLICATIONS

C.M. Sayers: "The Elastic Anisotrophy of Shales," *Journal of Geophysical Research*, vol. 99, No. B1, Jan. 10 1994, pp. 767–774.

P. W. Holbrook: "The Relationship between Porosity, Minerology, and Effective Stress in Granular Sedimentary Rocks," SPWLA 36th Annual Logging Symposium, Jun. 26–29, 1995.

P. W. Holbrook: "A Simple Closed Force Balanced Solution for Pore Pressure, Overburden, and the Principal Effective Stresses in the Earth."

(List continued on next page.)

*Primary Examiner*—Hezron E. Williams
*Assistant Examiner*—J. David Wiggins
*Attorney, Agent, or Firm*—Browning Bushman

[57] ABSTRACT

An improved technique to more accurately calculate pore pressure of sedimentary rock due to subsurface fluid expansion where the technique is built upon a combination of known force balanced in situ loading limb mineralogical stress/strain relationships with locally variable unloading stress/strain relationships, including that in stress/strain space, the material properties governed loading limb is an upper limit for the many possible unloading limbs; also, a method for relating these different natural stress/strain paths and applying the correct path to calculate pore fluid pressure from in situ force balance is disclosed such that the method is preferably calibrated with in situ stress/strain data which allows for a lithologic sealing caprock to be identified and the locally prevailing in situ unloading limb stress/strain relationship to be estimated, where the forced balanced loading and unloading calibrations are applied to more accurately determine well casing depths using either wireline or real-time "measured while drilling" petrophysical data; and also solidity (1.0—Porosity) is the in situ parameter of choice which can be measured petrophysically in the borehole, where pore pressure is the fraction of the total external load which is borne by the fluids in the pore space of a sedimentary rock, and the solid framework of a granular sedimentary rock bears the force balance remainder of the external confining load as effective stress; so that loading and unloading power law linear stress/strain relationships are determined between effective stress and solidity for common sedimentary rocks.

9 Claims, 5 Drawing Sheets

OTHER PUBLICATIONS

Ward, et al., "The Application of Petrophysical Data to Improved Pore and Fracture Pressure Determination in North Sea Central Graben HPHT Wells," Society of Petroleum Engineers Paper No. 28297, 1994.

Ward, et al.: "Evidence for Sediment Unloading Caused by Fluid Expansion Overpressure–generating Mechanics." Paper present at the Workshop on Stress in the North Sea, Norwegian Technical Institute (NTH), Trondheim Feb. 13–14, 1995.

Gaarenstroom, et al.: "Overpressures in the Central North Sea: Implications for Trap Integrity and Drilling Safety," *Petroleum Geology of Northwest Europe: Proceedings of the 4th Conference,* Edited by J. R. Parker, The Geological Society, London, pp. 1305–1313.

M. M. Carroll: "Compaction of Dry or Fluid–Filled Porous Materials," *Journal of the Engineering Mechanics Division,* Oct. 1980, p. 969.

P. W. Holbrook: "The Use of Petrophysical Data for Well Planning, Drilling Safety and Efficiency," SPWLA 37th Annual Logging Symposium, Jun. 16–19, 1996.

P. W. Holbrook, et al.: "Real–Time Pore Pressure and Fracture–Pressure Determination in All Sedimentary Lithologies," Society for Petroleum Engineers Formation Evaluation, Dec. 1995, pp. 215–222.

METHOD FOR DETERMINING SEDIMENTARY ROCK PORE PRESSURE CAUSED BY EFFECTIVE STRESS UNLOADING

BACKGROUND OF THE INVENTION

1. Field of Invention

The present invention relates to an improved method for determining the pressure of fluid contained in a sedimentary rock. A mineralogically general force balanced stress/strain—loading limb relationship is a starting point. This relationship is defined in U.S. Pat. No. 5,282,384 to Holbrook, assigned to the assignee of the present invention, and which is incorporated herein by reference, which discloses how to calculate sedimentary rock pore pressure when the effective stress load is either constant or increasing and also teaches how the minimum principal stress and fracture pressure also can be calculated from in situ strain data in Normal Fault Regime –biaxial basins. Fracture pressure and pore fluid pressure are the safe force balance borehole fluid pressure limits for drilling the uncased (open to the surface) portion of a borehole into the subsurface.

Well after these loading limb open borehole force balance relationships were disclosed in the prior Holbrook patent, an extended set of force balanced Earth in situ stress/strain inter-relationships was discovered. These Earth in situ force balance inter-relationships can be applied to further improve the drilling decision making process. This newly discovered Earth in situ force balance inter-relationship, led to a direct force balance means of determining the physical location and pressure upper limit of fluid expansion generated pore fluid pressure. The methods disclosed in this invention produce further valuable geological information from in situ petrophysical measurements which is useful in the hydrocarbon recovery industry.

2. Background

Pore fluid pressure and fracture pressure are the most important external geologic factors affecting the safety and cost of drilling of an oil well. Exceeding either in situ force balance limit in an open borehole frequently leads to dangerous and usually costly well control problems. The borehole fluid hydrostatic pressure (Pb) must be greater than the formation pore fluid pressure ($P_p$) if one is to avoid the risk of a possibly catastrophic blowout. Likewise, the borehole fluid circulating pressure must be less than the fracture propagation pressure (Pf) if one is to avoid the risk of lost circulation.

Several expensive casing strings are usually required so that an oil well can be drilled within the limits of the open borehole pore fluid pressure and fracture propagation pressure limits. Great savings would be realized during well planning if one or more casing string could be eliminated through better pore pressure and fracture pressure knowledge. The present invention also enhances the safety of oil or gas well drilling operations. Presently, a considerable portion of expensive rig time is spent in a remedial fashion dealing with unexpected pore pressure and fracture pressure problems encountered while drilling. The improved information from this invention should significantly reduce drilling operations costs by reducing the number of these dangerous situations.

Because of the critical relationship to drilling operations, there are numerous techniques for calculating pore fluid pressure. All known petrophysical prior art methods calculate pore fluid pressure indirectly based upon measured rock properties. Most of these methods follow a calibration procedure which is not based on mechanical or physical information. Instead, these calibration procedures are generally based upon the extension of an observed empirical relationship between a measured physical parameter and a "normal" or hydrostatic compaction trend. The empirical "normal" trend line (Pn) is the average value of the measured parameter which changes as a function of depth.

The change in the measured parameter (Pn) as a function of depth according to these prior art techniques is indirectly related to a change in compaction of the sedimentary rock. The measured parameter described in a pressure prediction technique is usually not compactional strain. The method operator in charge of pore pressure prediction must then decide whether the extrapolated "normal" compaction vs. depth trend line being used is correct or not using some non-physical interpretive basis. Direct empirical (i.e. non-physical) relationships have been the only pore pressure prediction techniques used by the oil industry until very recently.

Sedimentary rocks are compacted by the effective stress applied to their grain matrix framework. When fluid pressure is approximately hydrostatic and the overburden is gradually increasing, both depth and effective stress are increasing. Under these conditions, depth behaves as a pseudo-stress variable. However, when pore pressure is elevated, effective stress and overburden gradients can be either increasing or decreasing and depth is not a pseudo-stress variable.

Most of the prior art methods for determining pore fluid pressure use depth as a pseudo-stress variable in both "normal" and "excess" pressured intervals which results in significant pore pressure calculation errors. The potential for this error when using a non-physical velocity-depth trend line method will be illustrated later in reference to the patents to Kan et al.

Another significant failing of most prior art pore pressure calculation techniques is attributable to their basic formulation. According to prior art depth trend techniques, pore pressure ($P_p$) is calculated as a sum of "normal" hydrostatic fluid pressure which is inferred from an extended compaction-depth trend; plus a differential or "excess" fluid pressure ($\Delta P$) which is related to a measured difference from the "normal" trend. The ($\Delta P$) calibration or correction term is back calculated after the fact from measured pore pressures in a nearby well or group of wells within a local area. The equation expressing this non-physical local calibration relationship is:

$$Pp = Pn + \Delta P \quad (1)$$

where Pp is the pressure of fluid in the pore space of rock, Pn is the empirical calculation of the normal pressure trend line and $\Delta P$ is the difference in pressure from the normal pressure trend line.

Equation (1) is not a physically representative mathematical formulation. Pascal's Principle requires that all of the fluids in a given local pore space or container be at the same pressure. Physically speaking, "excess" pressure cannot and does not exist in a pore space. Since the "excess" pressure term ($\Delta P$) does not exist in nature, "excess" pressure cannot be physically related to any measured parameter. Calibrating a measured physical parameter to a quantity which does not exist, i.e. ($\Delta P$), has been an acceptable engineering shortcut for a long time. The penalty when applying this (Pp=Pn+$\Delta P$) shortcut method is that the results are specific to the calibration area and the fluid pressurization mechanism in that particular field or reservoir. "Normal compaction trend" operators usually do not know the fluid pressurization mechanism, nor can they change their procedure to account for the mechanism. The (ΔP) calibration is fundamentally non-physical and not related to the known loading and unloading stress/strain relationships of sedimentary rocks. As these stress/strain relationships are so different, there is great risk in mis-applying an empirical (Pp=Pn+ΔP) relationship which contain no means of determining stress paths.

U.S. Pat. No. 5,081,612 to Scott et al discloses a method for determining formation pore pressure from remotely sensed seismic data. This particular method depends upon a hydrostatically compacted reference velocity vs. depth (Pn) profile. Referring back to Equation 1, this profile is essentially an observed or inferred curved (Pn) velocity gradient. The Scott et al pore pressure gradient technique applies to shale, which is also common to most of the prior art methods using a (Pp=Pn+ΔP) formulation. Pore pressures are calculated with respect to the reference velocity vs. depth trend line which is an indirect violation of Pascal's Principle.

In U.S. Pat. Nos. 5,130,949 and 5,233,568 to Kan et al, like U.S. Pat. No. 5,081,612 to Scott et al, the basic pore pressure prediction method is also based upon a velocity vs. depth compaction trend line. Kan et al's FIG. 5 demonstrates the historically common but physically incorrect (Pp=Pn+ΔP) methodology. The normal compaction trend line interpreted from the hydrostatic zone is shown on FIGS. 5b and 5d. The lowest hydrostatically compacted data point is slightly above 5,000 feet. The extrapolated (Pn) interval transit time-depth trend line decreases by half continuously every 8,000 feet on the logarithmic transit time scale shown.

The extrapolated empirical (Pn) shale transit time—depth trend line is beyond any possible physical reality at 8,000 feet or essentially 3,000 feet into the overpressured zone. Shales can compact no further than zero porosity which corresponds to a transit time of about 90 microseconds/foot. In regions that are more nearly hydrostatic than the example shown in reproduced FIG. 5, the 90 microseconds/foot shale transit time limit is not reached at depths above 20,000 feet.

The calibration within the (Pn) hydrostatic zone above 5,000 feet is reasonable. The projection to 90 microseconds/foot 3,000 feet below top of overpressure is physically unreasonable. Quartz is the most compaction resistant sedimentary mineral. The extrapolated (Pn) trend passes the zero porosity quartz transit time of 56 microseconds/foot at about 14,000 feet. The transit time of the Mohorovic discontinuity below the base of the Earth's crust is about 37 microseconds/foot. The (Pn) trend line is 37 microseconds/foot at 19,000 feet and continues to increase below. The actual depth of the base of the crust is about 100,000 feet on average, not 19,000 feet which is extrapolated from the interpreted normal shale compaction (Pn) depth trend of FIG. 5 of Kan et al.

The extrapolated (Pn) trend is grossly off compared to known transit time limits below the hydrostatic zone. Applying the (Pp=Pn+ΔP) methodology the known error in the projected (Pn) depth trend is forced into the (ΔP) term which is calculated by difference. Thus, the physically unreasonable (Pn) trend is automatically compensated for by the physically invalid (Pn+ΔP) formulation relied upon for calibration. In fact any combination of (Pn+ΔP) is forced to the correct answer by the measured pore pressure (Pp) in a calibration well. It takes two equal and opposite wrongs; one physically unrealistic (Pn), and one physically invalid (ΔP) to make a right (Pp). Whenever the extrapolated (Pp=Pn+ΔP) trend line methodology is reported to have been successfully applied; it signifies only that a force balance (ΔP) correction has been applied to a frequently erroneous extrapolated (Pn) trend line.

All of the extrapolated (Pp=Pn+ΔP) trend line methods suffer from the same non-physical (Pn) extrapolation which is transparent to the operator after the local calibration is made. The calibrations have only local applicability because you get a different extrapolated (Pn) trend depending upon where the base of the hydrostatically compacted depth interval occurs. In any particular area many other physical factors, for example overburden gradient, that exist affect the empirical calibration at that depth but are not accounted for in the empirical short cut methodology.

There are at least three (3) prior art methods for determining pore fluid pressure from petrophysical measurements which are based upon the effective stress law. A one-dimensional gravitational force balance was elucidated by Terzaghi, in his 1941 article entitled "Undisturbed Clay Samples and Undisturbed Clays", discussing compaction studies of marine sediments. Terzaghi first presented this uniaxial force balance equation;

$$Pp = S_v - \sigma_v \qquad (2)$$

This relationship states that the fluid pressure in the pore space (Pp) can be calculated as the difference between the overburden load (Sv) and the vertical load borne by the sediment grain—grain contacts ($\sigma_v$). In the science of rock and soil mechanics, this ($\sigma_v$) term is known as the effective vertical stress.

U.S. Pat. No. 5,200,929 to Bowers is based upon in situ empirically determined velocity vs. calculated effective stress relationships. It uses the Terzaghi uniaxial Equation (2) to calculate effective stress. In NFR~biaxial basins the uniaxial calibration is coincidentally related to average effective stress force balance which directly causes the observed sediment compaction. This method accounts for both the loading and unloading stress/strain relationships of sedimentary rocks. The method is intended for use only in velocity reversal zones where fluid expansion unloading is the known fluid pressurization mechanism. The method is dependent only on velocity measurements which are indirectly related to strain and lithology.

The Bowers method is a significant technical advance because it uses a uniaxial approximate measure of effective stress and for its recognition of stress/strain hysteresis in sedimentary rocks. However, like the previously described pore pressure methods, the Bowers method also depends upon local empirical-velocity calibration to determine the coefficients for all its calibration and pore pressure prediction relationships.

Using in situ velocity vs. effective stress data for shales only, Bowers describes a method for defining the shape of loading and unloading effective stress-shale acoustic velocity curves. His "virgin curve relationship" is portrayed as the solid line on Bower's FIG. 4. This curve corresponds to a loading limb stress/strain relationship with shale velocity being the indirect measure of strain.

At present the shale velocity-strain relationship is still poorly known. The velocity of an individual shale sample varies by up to 25% depending on whether the measurement is made parallel or perpendicular to bedding, as discussed in a 1994 article by Sayers, entitled "The Elastic Anisotropy of Shales". An in situ measurement of velocity on shales with identical strain would produce very different pore pressure answers depending on the formation dip at the measurement location.

FIG. 4 of the Bowers patent shows how the extension of local empirical velocity loading limb and unloading limb relationships intersect. The position of this intersection point in both depth and effective stress space has a major impact on the value of the unloading limb calculated pore pressure. The data from both loading and unloading limbs must be known and their curving functions determined through interpolation before their intersection point can be determined by extrapolation. No other means for establishing the onset of unloading limb pore pressure is revealed by Bowers. If this method were to be applied with real-time Measurement-While-Drilling data, one would not have a criterion to determine where and when to switch from loading to unloading stress-velocity relationships.

U K Patent No. 2,174,201A to Fitzgerald reveals a common misunderstanding with respect to the interpretation of laboratory vs. in situ stress/strain relationships. Fitzgerald's method is based upon two (2) linear acoustic velocity vs. stress relationships observed in two (2) shales in a laboratory. Virtually all observed laboratory stress/strain relationships occur along the dominantly elastic unloading-reloading stress path of a rock sample. These rock specific stress paths intersect a mineralogy specific loading limb stress path at the point of maximum effective stress loading. There is no clear indication apparent during laboratory experiments on relatively hard rocks when or where the hysteresis join point is reached. The slopes of the initial loading vs. unloading-reloading limbs are very different.

Fitzgerald's patent indicates a lack of awareness of stress/strain hysteresis in sedimentary rocks and makes calculations based only upon the unloading-reloading stress path. In Fitzgerald, the key rock description qualifier "known constitution" is entirely appropriate and correct. For this method to operate as described a huge catalog of "known constituent" sedimentary rocks would have to be provided to appropriately match stress paths. Only two (2) rock stress paths are described. Fitzgerald describes three (3) empirical stress path coefficients which would need to be established to have a predictive equation. These coefficients could not be established without the "known constituent" rock sample or its equivalent from a rock sample catalog. The Fitzgerald patent is operative only for the two (2) rocks described and could not be generalized into a general subsurface pore pressure predictive method.

U.S. Pat. No. 5,282,384 to Holbrook applies force balance for pore pressure prediction using a power law effective stress/strain compaction function. The key scientific elements to this methodology and approach are:

1. The use of the uniaxial Terzaghi force balance (Equation 2) in ~biaxial Normal Fault Regime Basins.
2. The correlation of effective stress to solidity (1.0–φ, where φ is porosity) which is a direct measure of in situ strain for granular solids. One skilled in the art will recognize the substitution of the relationship (φ/1.0–φ).
3. The discovery through this application that both vertical effective stress and the effective horizontal/vertical stress ratio in ~biaxial Normal Fault Regime basins are directly related to in situ strain in all lithologies and at all depths.

These direct stress/strain relationships are related to sedimentary rock mineralogy and expressed quantitatively as Equations 6, 7, and 8 in the Holbrook Pat. No. 5,282,384. These equations and empirical coefficients describe a complete three-dimensional grain and fluid force balance. Additionally, the equations in the patent explain why and how the uniaxial Terzaghi force balance works in ~biaxial Normal Fault Regime basins where horizontal effective stresses are known to increase with depth. Further, lithologic and stress technical support for the patented method are described in articles by Holbrook in 1995, "The Relationship Between Porosity, Mineralogy, and Effective Stress in Granular Sedimentary Rocks", and 1996, "The Use of Petrophysical Data for Well Planning, Drilling Safety and Efficiency" and "A Simple Closed Force Balanced Solution for Pore Pressure, Overburden, and the Principal Effective Stress in the Earth".

There are severe calibration problems with all of the ($Pp=Pn+\Delta P$) prior art empirical pore pressure prediction methodologies described above. Most of the prior art acoustic pore pressure prediction methodologies use the same non-physical relationship (Equation 1) and suffer the same general pore pressure calibration-prediction problems. The calibrations for all these methods, even including Bowers' (Equation 2) empirical effective stress-velocity relationships apply only locally. The fundamental problem with all the other prior art methods is that of the unspecified relationships between stress and strain. Holbrook (Equation 2) is the only prior art pore pressure method which embodies a direct physical in situ stress/strain calibration basis.

Articles by Ward et al in 1994, "The Application of Petrophysical Data to Improved Pore and Fracture Pressure Determination in North Sea Graben HPHT Wells", and 1995, "Evidence for Sedimentary Unloading caused by Fluid Expansion Overpresssure-generating Mechanics", point out evidence for fluid expansion generated fluid overpressuring which was directly related to in situ measurable strain (solidity). The unloading limb stress/strain (solidity) data plotted in a very different areas are in general agreement with Bowers' "virgin curve" vs. unloading velocity data. Ward et al's FIG. 2 from their 1994 article illustrates the similarities, differences, advantages and implementation problems associated with applying unloading stress/strain relationships to the problem of pore pressure determination.

The Ward et al FIG. 2 loading and unloading limb relationships are power law linear stress/strain functions. The major significant advantages of this over the Bowers calibration are that: 1) effective stress is directly related to in situ strain; and 2) the power law function is linear, not curved, which makes calibration, interpolation and extrapolation much more simple and reliable. FIG. 4 of Bowers and FIG. 2 of Ward et al are geometrically similar. Bowers' shale velocity curves would approximate Ward et al's power law linear stress/strain functions if the appropriate material properties transformations were made. The interpretation calibration step and the pore pressure prediction step are much easier to accomplish and more accurate when using the force balanced power law linear relationships.

Ward et al points out in their FIG. 3 that there are many possible unloading stress/strain relationships related to the loading limb relationship depending on the last peak effective stress loading. The interpretive definition of this loading limb intersection point is a critical problem here as it was in the Bowers' methodology.

Ward et al, in the 1994 article, made some observations which are illustrated as FIGS. 3 and 4 which are coincidentally related to a physical rock properties means of determining the loading vs. fluid expansion unloading intersection point in the subsurface. The depth range of a low porosity vertical seal is shown on the FIG. 3 geologic cross section. Pore fluid pressure gradient as indicated by the heavy curved lines on the figure increases dramatically somewhere within the low porosity seal zone. The onset of fluid expansion unloading probably occurs somewhere in the low porosity seal zone which can be recognized from petrophysical measurements. This relationship is discerned mainly by inference from the markedly different observed pressure gradients above and below the low porosity seal zone. Low porosity is a property of the seal zone, but it does not capture or quantify the actual pressure seal relationship.

Ward et al's 1994 article FIG. 5 is a generalized pressure profile showing the relationships between disequilibrium compaction fluid pressurization mechanisms and fluid expansion pressurization mechanisms. The low porosity vertical seal within the chalk is also shown on this diagram. Supporting this circumstantial evidence are the calculations of which indicated that a very low permeability seal is needed for the fluid expansion pressurization mechanism to be operative.

Gaarenstroom et al, in a 1993 article entitled "Overpressures in the Central North Sea: Implications for Trap Integrity and Drilling Safety", also demonstrate a reasonable partial understanding of the relationships that govern pore fluid pressure in the subsurface. Gaarenstroom et al relate trap integrity to formation strength. While a certain minimum formation strength is required, it is not strength that is regulating the compartment pressure. Very weak shales, salt, as well as very strong impermeable quartzites have very different strengths. All these different strength lithologies can equally well accomplish the job of sealing a pressure compartment as long as they have sufficiently low intergranular permeability.

FIGS. 3 and 4 of the Ward et al 1994 article show the transition between loading and unloading limb stress/strain relationships is related to a low porosity zone within the North Sea chalk interval. The transition between effective stress loading and unloading occurs in this zone. The zone definition is broad and general and does not specify the sealing mechanism or exactly where the seal is located within the low porosity zone. The difference between Ward et al's description and the present invention is that low porosity is coincident with, but is not equal to high fracture pressure. A low porosity rock will have different fracture pressures which also depend upon vertical effective stress and pore pressure. Fracture pressure is the actual force that holds the in situ Compartment Pressure Limit Valve closed.

Ward et al and Gaarenstroom et al have identified two (2) different factors, strength and low porosity which are coincidentally related to fracture pressure under special circumstances. Methods related to these parameters should work in a relative sense under the particular geologic situation they describe. The distinction made here is that when fracture pressure is used as the discrimination parameter, the method works in general because of force balance regardless of these other circumstances.

The relationships described by Gaarenstroom et al, Bowers and Ward et al indicate that they have a general understanding of the factors coincidentally related to the occurrence of pressure compartments, and loading vs. unloading stress/strain relationships. The caprock seal required for unloading can be recognized as a relative porosity low within a sequence as described by Ward et al. Porosity provides a means for recognizing a compartment pressure seal under the specified average regional conditions. But porosity does not provide the means for quantifying the caprock's pressure sealing capacity which controls the pore pressure below.

Seal pressure capacity is the truly important aspect of pore pressure forecasting ahead of the bit. Gaarenstroom et al describe rock strength relationship is likewise a related seal recognition criteria which lacks the means for seal capacity quantification. The solution to these problems lies in the seal mechanism which is not identified in the prior art.

SUMMARY OF INVENTION

The present invention provides an improved technique to more accurately calculate pore pressure of sedimentary rock resulting from subsurface fluid expansion.

There is a static force balance between the total external load applied to a subsurface sedimentary rock and the grains and fluid which compose that rock. All of the external load, which can be described as three (3) principal external confining stresses ($S_{AVE}$), is borne by the solid and fluid which compose a sedimentary rock. The fluid in the pore space of a sedimentary rock supports its portion of the external load isotropically as a pore fluid pressure (Pp). The solid grains of a sedimentary rock support the remaining external load which is called effective stress ($\phi_{AVE}$). The solid phase can support some level of anisotropy between the three (3) principal stresses. Even if the levels of the three (3) principal stresses are not known; the static balance between external ($S_{AVE}$) and internal ($Pp+\sigma_{AVE}$) forces is known to be equal as demonstrated by the effective stress theorem in the 1980 article by Carroll, entitled "Compaction of Dry or Fluid Filled Porous Material".

The solid portion of a sedimentary rock is composed almost entirely of a few simple minerals. Each mineral is a crystalline structure having an ordered spacing of ions, and a narrowly fixed chemical composition. The effective stress load is ultimately borne by the mineral ionic bonds. Average ionic bond strength is the main factor controlling the physical and chemical properties of minerals. Knowing the mineralogic composition of a sedimentary rock, places narrow limits on a host of useful related rock physical and chemical properties including compaction resistance and rock strength.

Solidity is the complement of porosity $((1.0-\phi)=solidity)$. Solidity is a very important rock physical property which is also a direct measure of compactional strain for sedimentary rocks. The choice of solidity as the strain definition in conjunction with force balance stress definitions is a particularly useful though hardly used frame of reference in rock mechanics. This combined rock property (solidity=total in situ strain) frame of reference gains one a degree of freedom on many rock and soil mechanics problems. Many rock mechanics interrelationships that have otherwise required measurement control are therein controlled by definition.

The required elements for this new technique are either force balance definitions, material properties definitions, or strain definitions upon which an in situ pore pressure prediction methodology can be built as discussed in the 1996 article by Holbrook. These definitions provide the basis for a rock mechanics system which depends only upon in situ petrophysical and borehole fluid pressure measurements. Stress and strain (solidity) are related through force balance and composition (mineralogy), all of which are indirectly measured in situ with calibrated petrophysical instruments.

There are two (2) significant new developments which are built upon U.S. Pat. No. 5,282,384 to Holbrook. There is an internally regulating interaction between the two (2) force balance variables, fracture pressure and pore pressure in the subsurface. This relationship is an in situ relative force balance corollary to the basic force balance methods disclosed in the above patent.

Identifying a quantifiable force balance seal mechanism is the first step to a more general solution as to when and where to switch between loading limb and unloading limb stress/strain relationships. A force balanced in situ petrophysical measurement adaptive method for triggering the switch is disclosed in this patent. The unloading limb stress/strain relationship is calculated from a calibration well trigger point. The adaptive method assures consistent trigger point placement between planning and drilling wells. The planning well measured unloading limb stress/strain relationship is applied from the drilling well trigger point for pore fluid prediction within a fluid expansion unloading compartment.

The maximum compartment pore fluid pressure limits can also be calculated indirectly from related in situ force balance relationships at the trigger point when the sealing mechanism is known. The new method involves a mechanism dependent transfer of mechanically sensible in situ stress/strain relationships from planning or drilling well in situ petrophysical measurements. The compatible methods for force balanced pore pressure calculation and underlying compartment upper fluid pressure limits will be described below.

Fracture pressure at the free water level of a reservoir is the upper fluid pressure limit for the relative hydrostatic pressures within a continuous reservoir compartment. By projecting caprock physical rock properties and overburden to the free water level, one can thereafter predict the pore fluid pressure limit for the entire pressure compartment using Pascal's Principle. At great depth and in the presence of fluids that have significant thermal expansion potential, most continuous pressure compartments are at this pressure limit.

These and further objects, features and advantages of the present invention would become apparent from the following detailed descriptions, wherein reference is made to the Figures n the accompanying drawings.

DETAILED DESCRIPTION OF THE PREFERRED EMBODIMENT

U.S. Pat. No. 5,282,384 to Holbrook, which is incorporated herein by reference, is a complete and accurate description of the method to calculate sedimentary rock pore pressure and fracture pressure in Normal Fault Regime-biaxial basins under loading limb stress/strain conditions. In ~biaxial NFR basins, the maximum principal and effective stresses are vertical; and the two (2) horizontal stresses are approximately equal. The compactional calibrations in this method are derived from in situ loading limb stress/strain (solidity) relationships as discussed in the 1995 article by Holbrook previously mentioned herein. Vertical and the two (2) approximately equal horizontal effective stresses are related to solidity in these basins as described by Equations 6, and 8 of U.S. Pat. No. 5,282,384. Overburden (Sv) and effective vertical stress ($\sigma_v$) differ by pore fluid pressure (Pp). This is Terzaghi's uniaxial force balance effective stress law (Equation (2) herein) which is coincidentally proportional to total stress in NFR ~biaxial basins. More than half of the world's sedimentary basins have ~biaxial NFR stress fields.

A closed form force balanced stress/strain relationship exists in NFR ~biaxial basins as described in the 1996 article by Holbrook, because all three (3) principal stresses are directly related to the same measure of volumetric strain (solidity). Sedimentary rocks are mixtures of mineral grains. Only two (2) coefficients ($\alpha$, and $\sigma_{max}$) are required to relate volumetric stress to strain. These coefficients can be calculated using Equations 4, and 5 of U.S. Pat. No. 5,282,384 as a mineralogically weighted average for all sedimentary rocks as discussed in the 1995 article by Holbrook. The effective stress loading limb relationship for a sedimentary rock of any mineralogic composition is described as Equation 6 of that same patent. U.S. Pat. No. 5,282,384 is the preferred embodiment for obtaining the force balance variables; 1. overburden, 2. effective vertical stress, 3. pore fluid pressure 4. effective horizontal stress, and 5. fracture propagation pressure. These variables are related through force balance in ~biaxial NFR basins and this natural physical constraint offers many advantages over any other procedure for arriving at the same five (5) variables.

All the other prior art pore pressure and fracture pressure methods depend indirectly on these five (5) physical variables in one way or another. This preferred embodiment description is not meant to exclude any other means of approximating these five (5) variables under any basin or location specific conditions. The reason U.S. Pat. No. 5,282,384 is preferred is that it is exactly physically representative. The known force balanced interdependence of all five (5) variables is a powerful boundary condition which is applicable to location specific conditions within ~biaxial Normal Fault Regime Basins.

Figure 1:
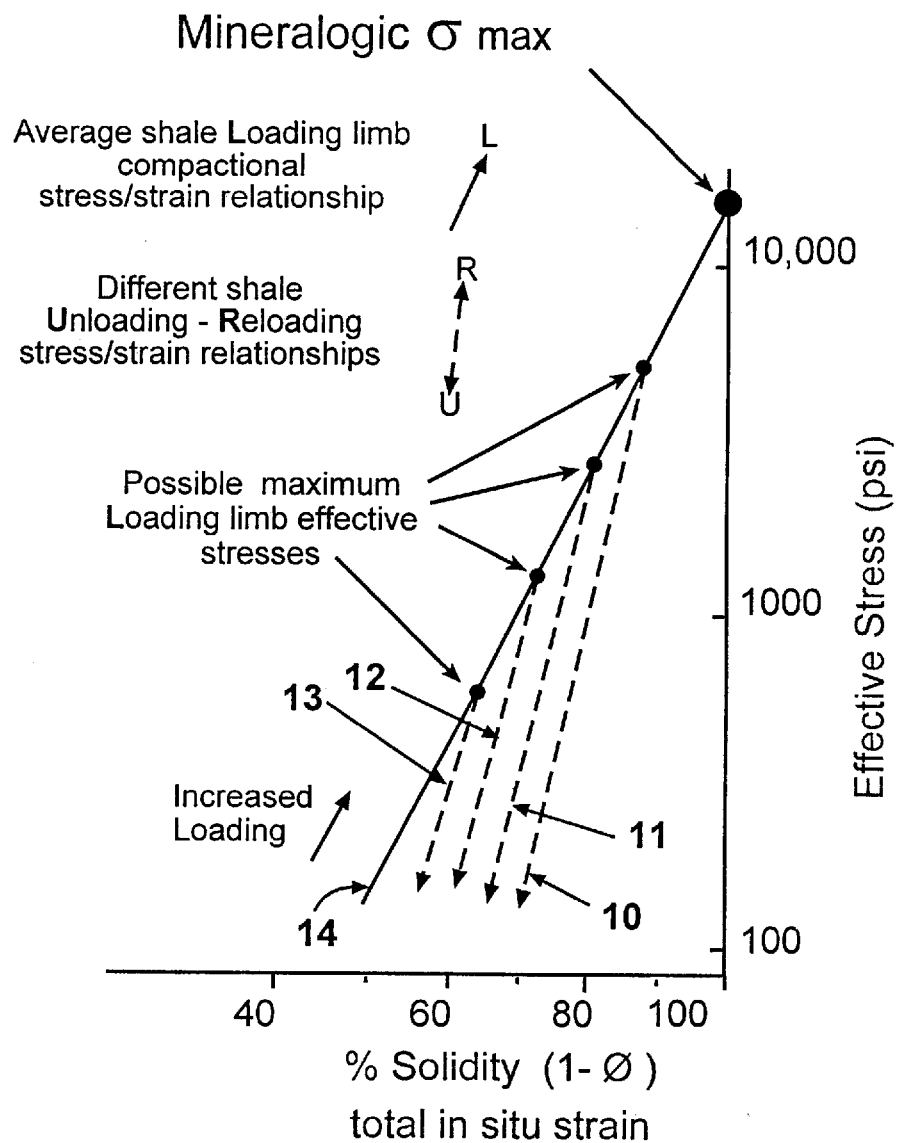
FIG. 1 graphical represents the power law linear loading and unloading in situ stress/strain relationships for shale formations.

The preferred procedure for defining an unloading limb stress/strain relationship is to relate it to the appropriate loading limb stress/strain relationship, ie. Equation 6 of U.S. Pat. No. 5,282,384. The many possible unloading limb stress/strain relationships shown on FIG. 1 as 10, 11, 12 and 13 can also be expressed as power law functions like Equation 6. At geologic loading rates the loading limb 14 is a physical upper limit to the unloading-reloading limb. Starting from any unloaded point under the loading limb 14 portrayed on FIG. 1, a reloading limb stress/strain path (for example dashed line 10) will be followed until the loading limb envelope is reached, as defined by Equation 6. Further, additional loading will follow the solid Equation 6 loading limb stress/strain path 14 toward the ($\sigma_{Max}$) total solidity intercept.

The preferred point of departure or reattachment of an unloading limb, for example 10, to the loading limb 14 depends upon a physical mechanism in the subsurface. Under most circumstances thermal or hydrocarbon cracking fluid expansion mechanisms produce relatively small volumes of fluid. A very efficient seal is required for this small fluid volume to significantly raise the fluid pressure of a large volume continuous fluid pressure compartment. The high fluid pressure seal must be continuous and unbroken over the top of the compartment in order to be an effective seal. Within a single observation well, a local point of maximum pressure sealing efficiency (low intergranular permeability and high fracture pressure) would be part of the required pressure seal for a continuous pressure compartment.

Owing to Equation 8 of U.S. Pat. No. 5,282,384 a local fracture propagation pressure maximum will correspond to a local porosity minimum which will usually coincide with a local intergranular permeability minimum. Both intergranular permeability and fracture permeability will usually be relatively low in the same place but for different reasons. Open fracture permeability is many orders of magnitude higher than intergranular permeability for rocks that could form effective pressure seals. Fluid escape to the surface through fractures is many orders of magnitude easier than through the grains, so open fractures are the least work path.

Figure 2:
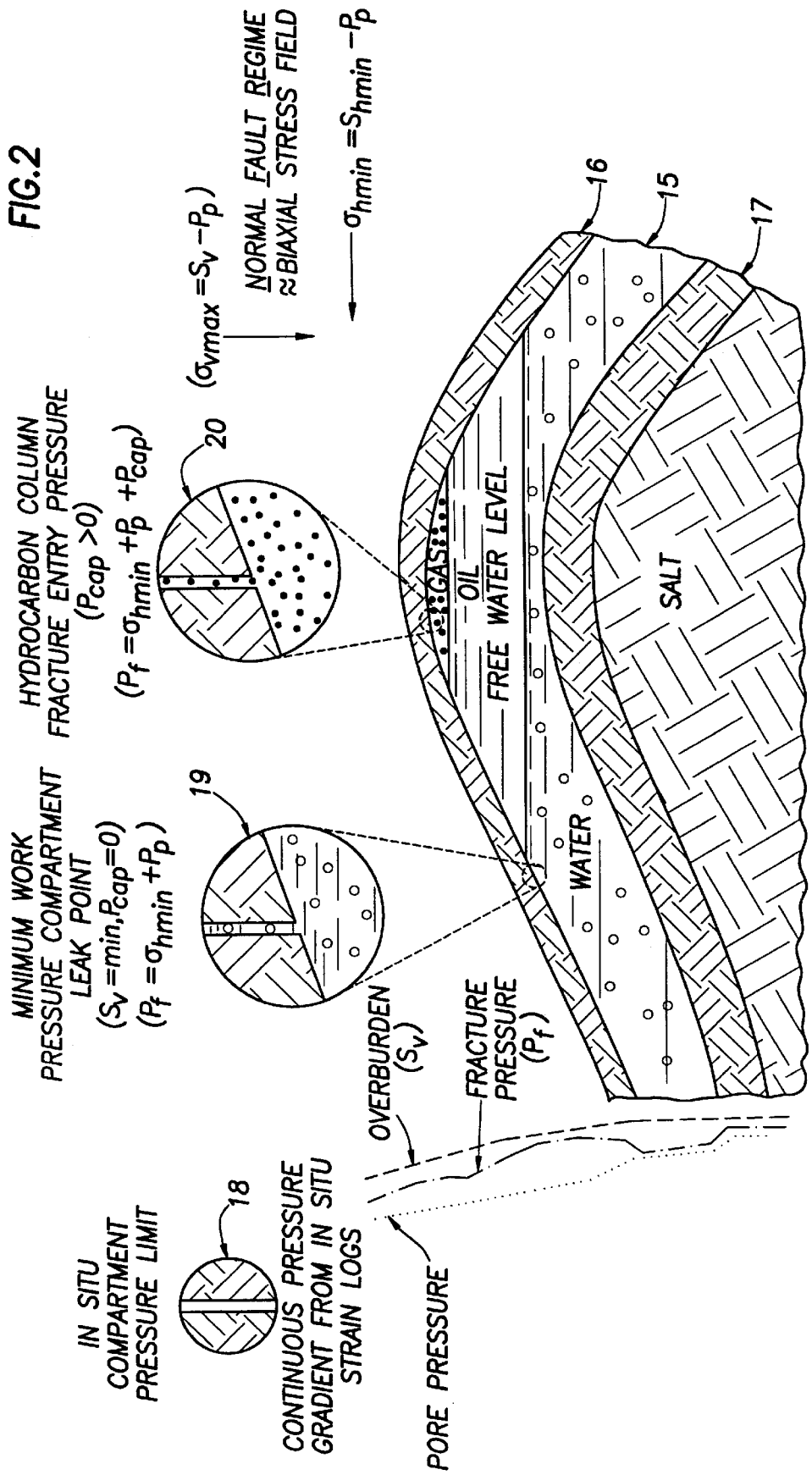
FIG. 2 illustrates a continuous fluid pressure compartment having a natural fracture system, caprock Minimum Work Fracture Pressure limit for the pressure compartment, and representative force balanced in situ Rock Mechanics System continuous logs.

FIG. 2 shows a generic pressure compartment illustrating the additional in situ corollary force balance interrelationships which are part of this new method. The stippled area 15 between the two (2) fractured shale beds 16 and 17 represents a continuous pressure compartment. A pressure compartment is a continuous rock body with sufficiently high permeability to reach a seal relative hydrostatic condition. It can be any size or shape. It is defined by its static fluid pressure property, (i.e.) that pressure everywhere within the compartment is a relative fluid density-elevation relationship which can be calculated using Pascal's Principle. For example, a continuous rock body with an intergranular permeability above 10 millidarcies would equilibrate to seal relative hydrostatic pressure within several thousand years and thus be a pressure compartment.

Caprock seal fracture pressure when applied with Pascal's Principle is the effective upper limit of the maximum pore pressure which can be reached anywhere within an underlying moderate to high permeability pressure compartment. Elevated pore pressure at the Minimum Work Leak Point of the underlying continuous pressure compartment will open fractures in the overlying caprock seal at its fracture pressure and fluid will easily escape until the fractures close. This spatial in situ fracture pressure/pore pressure force balance limiting relationship is general and leads to a new method for forecasting pore pressure below the top petrophysical sensor of a Measurement-While-Drilling tool string of the type known in the art based upon those sensor readings.

Inset circle 18 in the upper left of FIG. 2 represents a single vertical fracture perpendicular to the minimum principle stress within the caprock 16. The opposing arrows in all three (3) inset circles 18, 19 and 20 represent the minimum principal stress which has a magnitude proportional to the effective vertical stress in ~biaxial Normal Fault Regime basins. A tensile fracture with no shear offset will be closed if the pore fluid pressure within the fracture is less than or equal to the caprock fracture pressure.

The Minimum Work Leak Point, illustrated in 19, for a pressure compartment shown on FIG. 2 is just below the hydrocarbon water contact. If there are no hydrocarbons, and the caprock 16 has uniform petrophysical properties, the caprock Minimum Work Leak Point is at the highest elevation of the pressure compartment. The force balance at the pressure compartment—caprock interface changes systematically with overburden and elevation in FIG. 2 as it does with any pressure compartment.

The fluid pressure within the compartment changes in direct proportion to average fluid density/elevation (Pascal's Principle). For subsurface brines this fluid pressure gradient is somewhere between 0.434 to 0.507 psi/foot. The change in fracture pressure with elevation is somewhere within the range of 0.9 to 1.15 psi/foot. This force balance relationship depends on caprock porosity, overburden and pore pressure. The compartment pore pressure limit is much more dependent on overburden than it is on caprock porosity.

Starting from the lowest caprock seal point of a continuous pressure compartment and progressing upward, the sealing caprock fracture pressure decreases about twice as fast as the compartment pore pressure. A relatively uniform caprock 16 is about 0.5 psi easier to fracture with each foot of gained elevation. The caprock Minimum Work Leak Point is where the compartment pore fluid pressure is highest with respect to fracture pressure in the overlying caprock. At that point, there are no additional capillary forces to overcome to open a fracture if the fluid in the compartment and the fracture are equally wetting.

However, if the compartment pore fluid contains hydrocarbons and the fracture surfaces are water wet, a considerable additional capillary resistance must be overcome for the two-phase fluid in the reservoir to enter the water wet fracture. The additional pressure needed to force a two-phase fluid into a capillary size fracture is usually two times or more greater than the single phase pore fluid entry pressure. In general the capillary entry pressure for a hydrocarbon increases much faster than the slight additional pressure resultant from hydrocarbon/water density contrast. The increase in work required to force the two-phase fluid into the fracture is much greater than the slight decrease in fracture pressure that accompanies the change in overburden and elevation.

The relevant force balance affecting pore pressure, fracture pressure, capillary pressure and overburden are covered in the discussion above and their approximate magnitudes quantified. Tensile fractures are pervasive in the subsurface particularly where pore pressures have been elevated in the past. Considering all these together, the Minimum Work Leak Point for the pressure compartment will normally be very near the highest single-phase fluid elevation.

The above discussion omits the issue of compartment pressure communication through open faults. If an open fault cuts the pressure compartment anywhere, top or side; the open fault is the minimum work compartment pore pressure regulating mechanism. Open faults can only lower the compartment pore pressure below that of the caprock Minimum Work Leak Point for the pressure compartment. Even a perfectly sealing fault cannot exceed this. In a geologically short time, minerals are deposited in the open spaces within a fault zone. In the absence of continued fault displacement, cement deposition lowers fracture permeability gradually and returns the open fault to a closed sealing condition. When fault sealing is complete, the Minimum Work Leak Point again becomes the continuous compartment pressure limit.

Though perhaps not immediately obvious from the above discussion, fracture pressure derived while drilling can be used as an effective pore pressure limit predictor at or ahead of the bit. The drilling decision of whether or not an additional casing string is required depends upon the maximum pore fluid pressure expected below. Drilling can safely proceed through the underlying continuous pressure compartment without setting casing if the maximum expected pore fluid pressure within the compartment is less than the minimum open hole fracture propagation pressure.

The Measurement-While-Drilling petrophysical sensors, of the type known in the art, on a typical drill collar are usually placed as close as possible to the bit. This distance is often as little as twelve (12) feet. The increasing fluid pressure transition zone below a sealing caprock 16 is usually tens to hundreds of feet thick. In the well being drilled, fluid pressures within a pressure compartment ahead of the bit vary according to Pascal's Principle. The geometry and continuity of pressure compartments are known or inferred before an oilwell drilling location is selected. Garrenstroom et al in their 1993 article produced a map of the expected pressures and compartment lateral boundaries for a large part of the Central North Sea. A new well is generally drilled to find and produce hydrocarbons and there is an expected if not known hydrocarbon water contact.

As the well is drilled, geologists keep track of bottom hole location, and the stratigraphic interval being penetrated. Drilling fluid density is adjusted to be within a "Safe Drilling Window" which is defined by the drilling fluid density range between the maximum open hole pore pressure and the minimum open hole fracture pressure. It would be extremely valuable information if the driller could know the maximum pore pressure that can be expected before entering the next pressure compartment below. Another casing string will be required if the maximum pore pressure in the underlying compartment is above the minimum open hole fracture pressure. The maximum fracture pressure at the Minimum Work Leak Point for the pressure compartment calculated in combination with Pascal's Principle is the pore fluid pressure limit for the entire compartment.

FIG. 2 defines the unloading limb sealing mechanism as a relative force balance phenomenon. A local maximum fracture pressure can be defined from a continuous fracture pressure log. The trigger point-transition from loading limb to unloading limb stress/strain relationships would necessarily occur at some local fracture pressure maximum. A local fracture pressure maximum can be calculated directly from in situ strain data using a combination of Equations 7, 8, and 9 in U.S. Pat. No. 5,282,384 to Holbrook.

The opening and closing of minimum work fractures in rocks is controlled by Equation 9 of U.S. Pat. No. 5,282,384 force balance. D'Arcie flow to the surface operates independently of permeability type always following a least work path. As the method for establishing the maximum pressure sealing efficiency point is coincident with the point of departure from the loading limb, it will be described in detail first.

Figure 3:
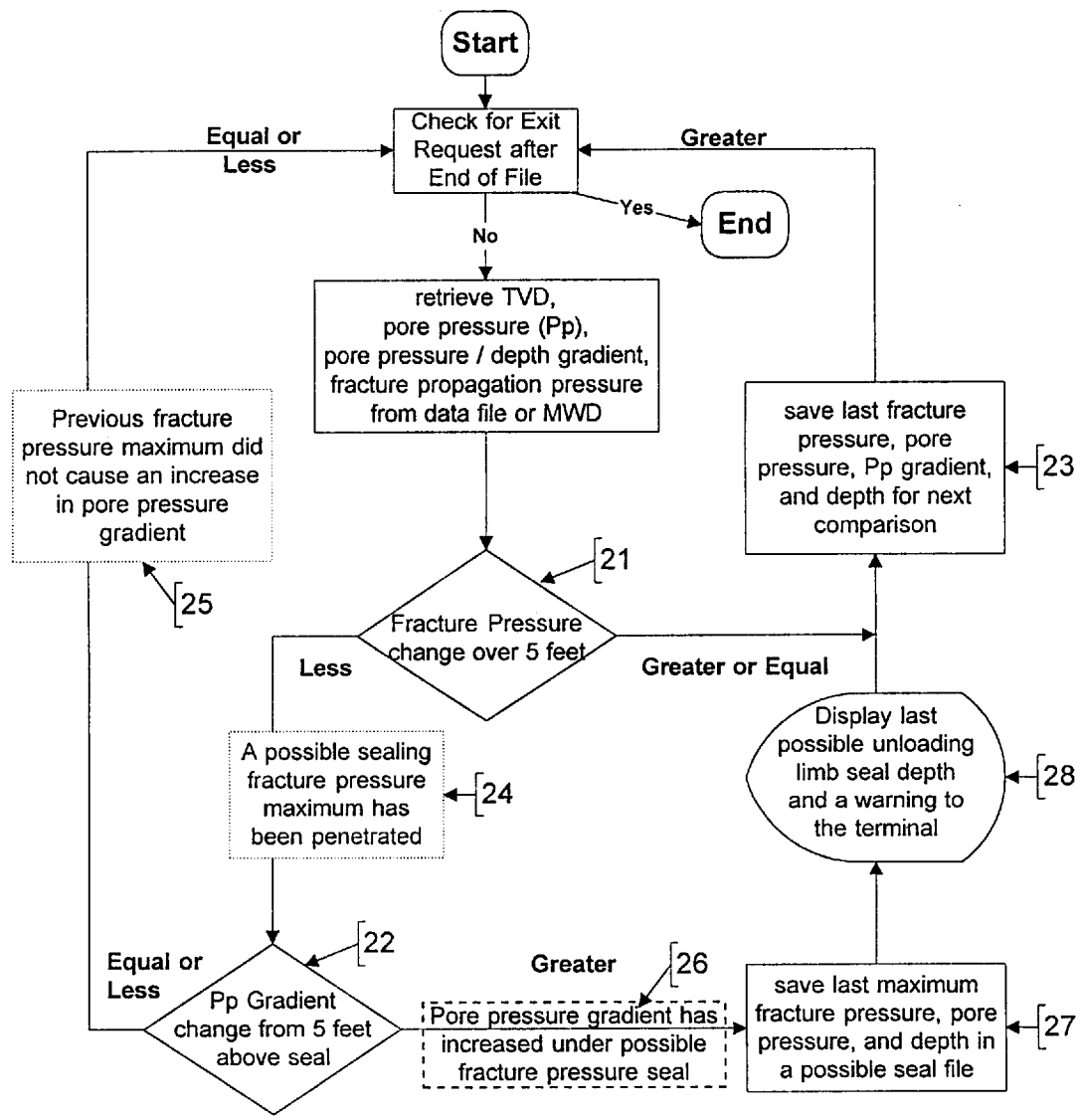
FIG. 3 is a program flow chart to identify pore pressure increases associated with possible local sealing fracture pressure maxima.

FIG. 3, is a logical flowchart to identify pore pressure increases associated with possible local sealing fracture pressure maxima. FIG. 3 describes a pair of binary decisions which, when executed with each successive True Vertical Depth (TVD) increment, will discriminate possible higher fluid pressure sealing fracture pressure maxima from those which are not. FIG. 3 describes a computer algorithm, which can be executed using TVD data from either file input or real-time drilling. Operations START, Check for Exit, Data retrieval, and END are external computer control operations which are not primary elements of the compartment seal recognition process. Recognition of possible pressure compartment seals is accomplished by the two decision diamonds 21 and 22 portrayed executed in series as shown in the flowchart.

The first decision diamond 21, "Fracture pressure change over 5 feet", defines whether a fracture pressure maximum has been reached or not by comparing successive values. If the estimated fracture pressure of the present point is greater than or equal to the last point, a locally deepest fracture pressure high has not been reached. There is no reason for further seal evaluation in this case, so control is passed to the "save last pressure", process box 23 and the next successive TVD set of data points is retrieved for comparison.

Following retrieval of the next set of data points, the same decision diamond 21, "Fracture pressure change over 5 feet", is encountered making the same decision on the next successive foot. This loop continues until the first falling fracture pressure data point is encountered. Dotted box 24 is on the logic flowpath, but is not a process. Box 24 indicates the fact that, "A possible sealing fracture pressure maximum has been penetrated". At this point the TVD set of data points is an unconfirmed candidate seal. But, the first short decision loop alone has eliminated most data points from seal candidacy.

The next decision diamond 22 encountered on the "Less" side of the first decision diamond 21 is "Pore pressure gradient change from 5 feet above seal". Here the comparison is made between the slope ($\Delta Pp/\Delta TVD$) of successive pore pressure estimates to determine if there has been any change within or across the candidate seal. There are two (2) possible alternatives of this binary comparison which are also shown on the logic flowpath in dotted outline boxes 25 and 26. Again these are not part of the process, but indicate the state of fracture pressure/pore pressure relationships at that point in the logical flowpath.

If the pore pressure gradient is "Less than or equal to", the previous TVD pore pressure gradient; the "Previous fracture pressure maximum did not cause an increase in pore pressure gradient", box 25, condition exists. The existing pore pressure trend is no greater than that above which may have been controlled by a loading limb stress/strain relationship. Most local fracture pressure maxima have a pore pressure gradient below which is no higher than the pore pressure gradient above. These data points are also eliminated as candidate seal points and the program loops back up to retrieve the next successive TVD set of data points. The left, "equal or less" half of this decision flowchart will always result in the elimination of a TVD dataset from candidacy as a possible unloading limb fracture pressure seal.

The only remaining possibility of this decision flowchart is that the, "Pore pressure gradient has increased under a possible fracture seal", box 26. This is a very important observation which triggers the next two process control operations. If the "Greater than" condition is met in the "Pore pressure gradient change from 5 feet above seal" decision diamond 21; the computer program or individual monitoring the changes in data should, "Save the last maximum fracture pressure, pore pressure, and TVD into a possible seal file", box 27. If these two (2) data comparisons are made by a computer program, the next step 28 in the process is to, "Display the last possible unloading limb seal depth and a warning to a computer terminal".

Increasing pore pressure gradient below a candidate seal is indicative of more dangerous drilling conditions below regardless of the fluid pressurization mechanism. The loading limb calculated pore pressure is a minimum expected pore pressure value for this TVD. From this point onward pore fluid pressure will either increase at the effective stress loading limb rate or faster. If pore pressure under a possible fracture pressure seal is increasing at a faster than previous ($\Delta Pp/\Delta TVD$) rate the operator should consider fluid expansion unloading as a possible additional pressurization mechanism and act accordingly.

The above described flowchart eliminates over 99% of the total drilled footage in any well from the candidate unloading limb fluid expansion pressurization category. The decision as to whether to shift to an unloading limb stress/strain relationship, and what that relationship most likely is should be made at this time.

The dual High Temperature, High Fracture Pressure conditions that lead to fluid expansion unloading are usually consistent within a local area. The methods of Bowers and Ward (1994) can identify the general areas and depth ranges where fluid expansion has definitely forced the subsurface stress/strain relationship onto the unloading limb. Their post facto methods of analysis also provide a reasonable estimate of the relative slope of the in situ unloading limb stress/strain relationship within a region and depth range.

The procedure described in FIG. 3 identifies which relative porosity low and consequent fracture pressure high is the seal within the caprock containing possible fluid expansion pore pressure. If the candidate unloading limb fracture pressure TVD falls within a depth window roughly defined by a Bowers or Ward method, the operator should seriously consider switching to an unloading limb stress/strain relationship at the most likely sealing point.

The methods for determining the maximum expected pore fluid pressure within an underlying continuous fluid pressure compartment, and a more accurate method for determining the slope of regional ($\Delta Pp/\Delta TVD$) gradient using the same five (5) physical variables will be described below.

Figure 4:
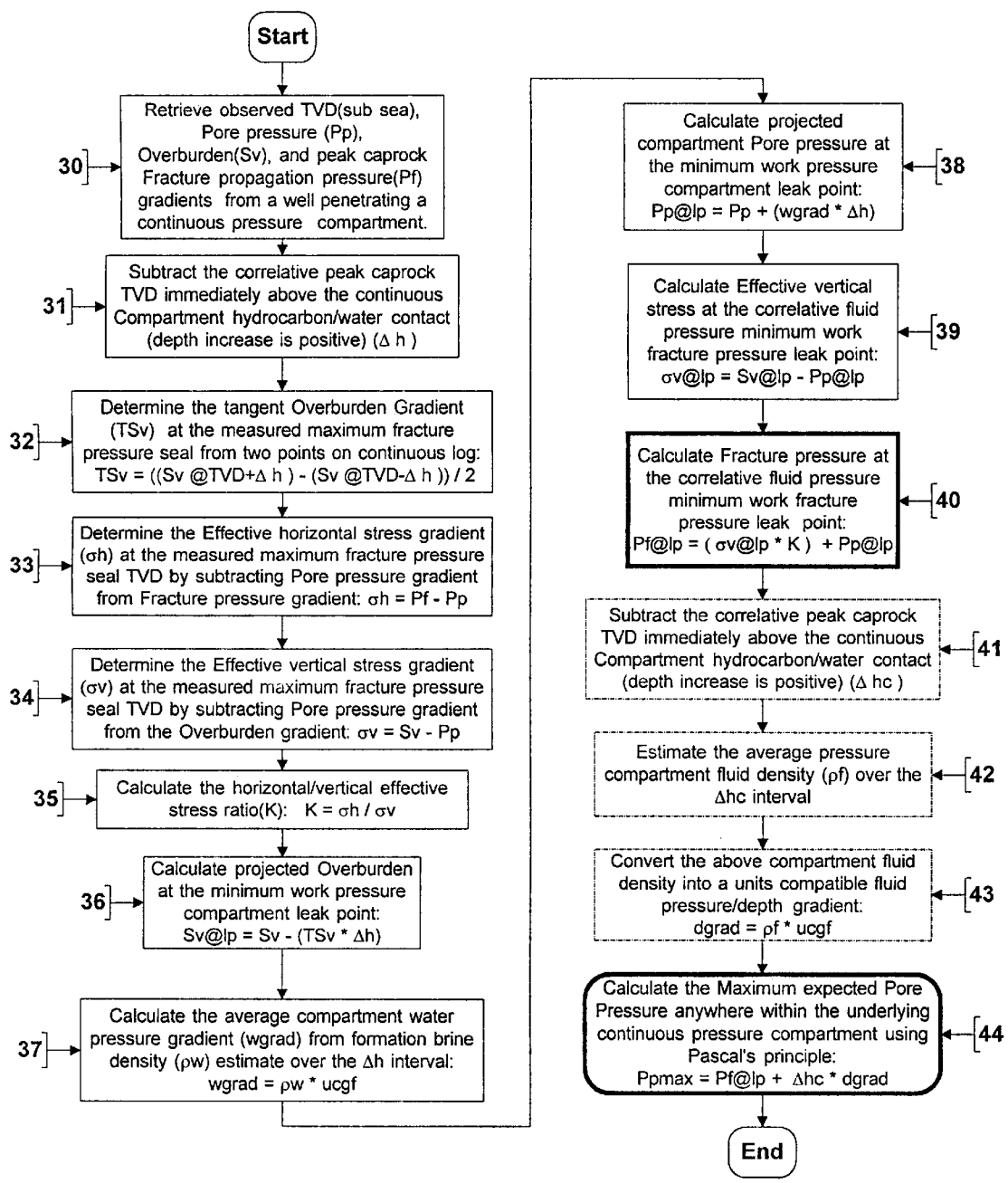
FIG. 4 is a program flow chart to identify the maximum expected pore pressure in a continuous fluid pressure compartment.

FIG. 4 is a flowchart describing the fixed process steps which should be taken to calculate the maximum expected pore pressure (Ppmax) that would occur anywhere within a continuous pressure compartment based upon an observed caprock fracture pressure above the minimum work compartment leak point (Pf@lp). FIG. 4 shows the procedure that corresponds to the general caprock to compartment physical-spatial relationships shown in FIG. 2.

The stepwise procedure described in FIG. 4 can be applied every time one penetrates an observed local fracture pressure maximum during the drilling of a borehole into the Earth. Typically, the distance between a fracture pressure maximum in a sealing caprock and an underlying continuous pressure compartment is 50 feet to 500 feet. Typically, the offset between the top petrophysical sensor in an MWD drillstring is less than 20 feet. The 30 feet plus margin is sufficient so that casing can be set in the low permeability caprock before the drill bit actually penetrates into the potentially dangerous higher permeability continuous fluid pressure compartment. Casing cemented across the highest fracture pressure in the caprock will provide the maximum margin of safety when initially penetrating the underlying continuous pressure compartment.

There are two (2) basic steps in the procedure for calculating the pressure limit everywhere within a continuous pressure compartment shown on FIG. 4. The first basic step is to calculate the minimum work caprock fracture pressure for the underlying compartment. The first ten (10) process steps, 30 through 39, are surrounded with solid line boxes lead to the heavy line process box 40 where this calculation is made.

The second basic step which applies Pascal's Principle to calculate pore pressure anywhere in the compartment has three (3) sub steps, 41, 42 and 43, whose process box outlines are dashed lines leading to heavy line process box 44. The fundamental process involves calculating the five (5) critical force balance variables from a measurement well profile penetrating the continuous pressure compartment. The solid rock related force balance variables, effective vertical and horizontal stresses are projected from the Tangent Overburden gradient in the measurement well profile. These values are projected to the expected True Vertical Depth of the Caprock Fracture Pressure Maximum above the expected hydrocarbon/water contact of the compartment. This provides a quantitative value for the force holding the pressure valve closed portrayed in the left blowup circle 19 on FIG. 2. Maximum fracture pressure at that Minimum Work Leak Point for the pressure compartment sets the proportional limit for the entire compartment.

The static fluid pressure proportionality function is Pascal's Principle which is a simple linear function of elevation and average fluid density ($\rho_f$) from the Minimum Work Leak Point for the pressure compartment. Subsurface waters are very close in composition to Sodium Chloride brines. The density of subsurface brines are often available from direct fluid density measurements of water produced from nearby oilwells. If these measurements are not available, the density of NaCl brines can be calculated with 0.01 g/cc accuracy from PVT-NaCl salinity relationships, as described in the 1987 article by Kemp.

The in situ density of oil and gas under various pressure, volume and temperature (PVT) conditions is also routinely calculated for reservoir production purposes. Repeat formation pressure measurements are frequently made within producing reservoirs to determine the in situ formation water pressure gradients (wgrad); or the in situ partially hydrocarbon saturated fluid pressure gradients (dgrad) directly.

The uncertainty in fluid density plays a very small role in the overall calculation scheme portrayed in FIG. 4. Fluids occupy only a small volume fraction in a sedimentary rock and fluid densities span a fairly narrow range. The variability the in four (4) solid rock related pressure gradients is much more important to the outcome of the overall calculation scheme. The selection of a good and representative tangent Overburden Gradient (step 32 of FIG. 4) is probably the most important step of the procedure from an overall quantitative output point of view.

The most significant factor affecting fluid expansion pressurization is the regional geothermal gradient. Higher geothermal gradients lead to greater fluid expansion with depth and steeper unloading limb effective stress relationships. Both the in situ loading and unloading limb stress/strain relationships are very steep. The loading limb effective stress slope is 83.46 degrees for shale, 85.67 degrees for rounded pure quartz sandstones and 85.66 degrees for rounded calcite grainstones.

The unloading limb effective stress/strain relationship for each of these minerals is steeper. At 90 degrees the stress/strain slope is undefined. The relative unloading limb stress/strain relationship is calculated in degrees so that a change in the unloading factor (UNL_FACT) will have a proportional change on calculated effective stress and pore pressure. The unloading limb factor is limited between 0.0 degrees which is coincident with the loading limb, and 4.19 degrees which coincides with the highest real number sigma max intercept which can be stored as a real number in a computer. Unloading factor values outside of this range are not allowed. This computer memory upper limit corresponds to a slope limit of 89.993 degrees which should not affect any real unloading limb calculations. The maximum expected real number slope using known maximum sediment porosities is 89.86385 degrees.

Given a very high fracture pressure seal, the unloading limb factor seems to vary within a narrow range (~0.02) degrees within an area of several square miles. The unloading limb factor is consistently higher in higher geothermal gradient areas and lower in lower geothermal gradient areas. There is not much unloading limb data at this time and all of the unloading mechanisms are not sufficiently well understood to go further. What can be said is that if the procedure described in the following flowchart is followed for several wells in a local area, the same unloading limb factor produces equally good results in all local area wells.

Figure 5:
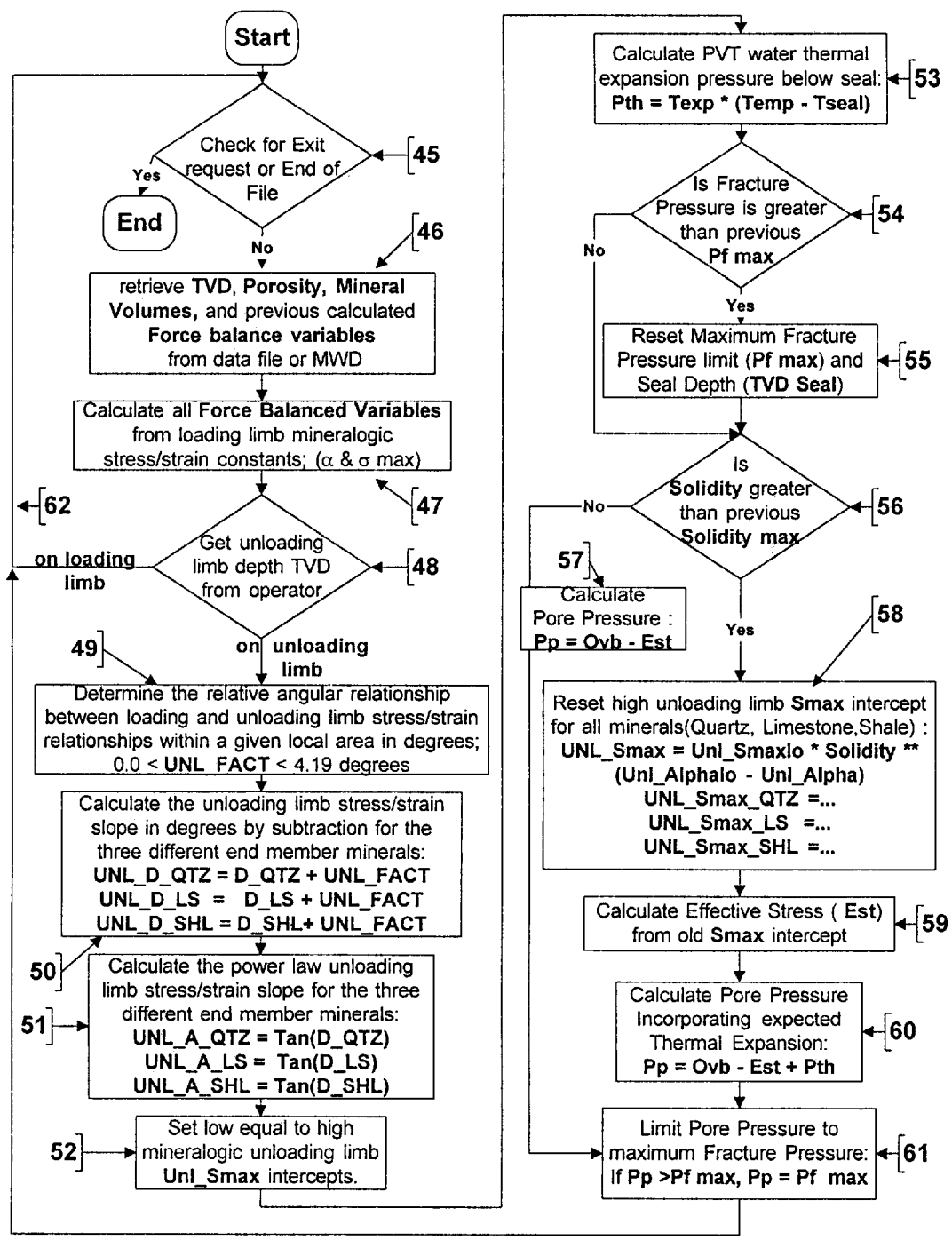
FIG. 5 is a program flow chart to calculate pore pressure using unloading stress/strain relationships.

The method described in FIG. 5 involves a more precise physically descriptive identification of seal depth which can cause the onset of fluid expansion unloading. In FIG. 5 the seal is identified and quantified by its high fracture pressure which is additional valuable information. The flowchart also provides a means for re-setting the mineralogic unloading limbs in case the operator errs in placing the estimated seal depth too high. This feature makes the overall procedure useful for real time drilling operations. The flowchart of FIG. 5 encapsulates how, where, and why one would switch from loading to unloading stress/strain relationships for pore fluid pressure calculations. The slope on the loading limb stress/strain relationships appear to be global constants which are only a function of average sedimentary rock mineralogy as described in the 1995 article by Holbroolk. The slope of the unloading limb stress/strain relationship is related to regional geothermal gradient, and must be determined for the local region.

Referring to FIG. 5, therein is described the preferred procedure. In FIG. 5 there are four (4) decision diamonds 45, 48, 54 and 56 on the program flowchart. The first two 45 and 48 involve operator choices, the second two 54 and 56 are objective choices which can be made by a computer based upon comparison of successive True Vertical Depth data values.

Steps 46 and 47 of the flowchart summarize the steps of calculating the critical five (5) force balance variables from successive petrophysical measurements. The method described by Holbrook, U.S. Pat. No. 5,282,384 is preferred, but any other procedure for acquiring the same five (5) force balance variables is not excluded.

The program operator must set the program onto the unloading limb at a depth based upon local experience in a given area 48. The preferred depth should correspond to a high fracture pressure seal. These seals are usually related to stratigraphic depth, but continuous diagenetic seals have also been suggested. At the expected onset of fluid pressurization unloading, the operator turns on an unloading limb calculation switch 48 which leads to the next lower part of the program flowchart. The operator also provides at this time, the unloading limb factor which is the number of degrees between the loading and unloading limbs in the local area 49.

The depth of a fracture pressure high in the probable seal is responsible for containment of fluid expansion pore pressure. The power law linear loading and unloading limbs intersect at that point. The porosity, mineralogy, and force balance variables at that depth are transferred to solve for the slope and intercept of the unloading limb given the unloading limb factor, step 50.

The unloading stress/strain (solidity) slopes for each end member mineral are preceded with "UNL_A_", with the described mineral descriptor attached, step 51. The stress/strain solidity=1.0 intercept of the power law function for each end member mineral are all labeled with the prefix, "UNL_Smax_", with the described mineral descriptor attached. The program reserves a low and high "UNL_Smax_" memory location which are set to the same value at 52. The high and low memory locations will be used subsequently if the operator has made an incorrect estimation anticipating the peals fracture pressure.

A peak, thermal expansion fluid pressure "Pth", is calculated from the average Geothermal gradient of the area, step 53. The average geothermal gradient is supplied by the operator, step 46. The depth difference between the "TVD Seal", and the present "TVD" depth of a sample provides the temperature difference needed for the calculation. The thermal expansion coefficient "Texp", for a Sodium Chloride brine under the existing pressure temperature conditions is used.

Following this step the program makes a data comparison 54, to determine if the fracture pressure at the present TVD is greater than the previous maximum fracture pressure "Pf max", which is held in computer memory. If the fracture pressure is less than "Pf max", there is probably no change in the unloading limb status. If on the other hand, fracture pressure has increased above the previous maximum, "Pf max", and "TVD Seal" are reset to the new higher values, step 55.

In either case the program proceeds to the next decision diamond 56, ie. "Is "Solidity" greater than the previous Solidity max", which is held in computer memory. Again if "Solidity" is less than the previous "Solidity max", the present mineralogic unloading limb slopes "UNL_A_", and stress/strain solidity=1.0 intercept, "UNL_Smax_", are still appropriate for calculating Pore Pressure from Effective stress and strain (Solidity), step 57.

If however, "Solidity" has increased above the previous "Solidity max", which is held in computer memory, the peal, sealing fracture pressure has not been reached. This is the "Yes" exit to the decision triangle which leads to a different calculation procedure for pore pressure "Pp", and a re-setting of the unloading limb stress/strain coefficients "UNL_A_", and "UNL_Smax_", effect is accomplished as shown in the process block 58, which is repeated for each mineralogic end member. Process block 58 corrects the unloading limb to account for the higher than expected seal fracture pressure "Pf" which will be applied to the next calculation.

Effective stress "Est" is calculated from the old "Smax" set of coefficients, step 59. There probably was some increment of thermal expansion since the last estimated seal depth in this case. That increment of additional pore pressure "Pth" is then added in the next process calculation 60.

A final pore pressure comparison 61 is made to determine if the calculated pore fluid pressure gradient, "Pp" has exceeded the previous maximum fracture pressure gradient "Pf max" which was held in computer memory. If so, then the calculated pore pressure is reduced to that fracture pressure gradient. This is the theoretical force balance limit if the fluid contained in the pressure compartment is water.

The program then displays and stores all calculated force balance variables and cycles back to gather more petrophysical data. This is portrayed by the return looping arrow 62 on FIG. 5. This step is executed in the same manner whether on the loading or unloading limb. The process continues until the program either runs out of data or is terminated by the operator. The overall process described in this preferred embodiment has described a method wherein an operator can calculate pore fluid pressure using mechanically sound force balance relationships using appropriate physical constraints whether the pressure driving mechanism is disequilibrium compaction or unloading fluid expansion.

The foregoing disclosure and description of the invention is illustrative and explanatory thereof, and various changes in the methods and techniques described therein may be made within the scope of the appended claims without departing from the spirit of the invention.

What is claimed is:

1. A method for determining pore pressure in a sedimentary rock at locations in a subsurface formation penetrated by a borehole, comprising the steps of:

determining the loading limb stress/strain relationship for said sedimentary rock using a forced balanced stress/strain relationship;

estimating the slope of the unloading limb stress/strain relationship for said sedimentary rock at a first location depth in said borehole using a forced balanced stress/strain relationship;

determining the intersection point of said estimated unloading limb stress/strain relationship with said loading limb stress/strain relationship;

determining the unloading limb stress/strain relationship for said sedimentary rock from said estimated slope and intersection point; and determining from said unloading limb stress/strain relationship the pore pressure of said sedimentary rock at multiple locations of said borehole.

2. The method of claim 1 further comprising the steps of:

determining the pore pressure in said sedimentary rock from said loading limb stress/strain relationship; and switching from said loading limb stress/strain relationship to said unloading limb stress/strain relationship to determine pore pressure for said sedimentary rock.

3. The method of claim 1 wherein said step of determining the unloading limb stress/strain relationship in a sedimentary rock penetrated by a borehole, comprising the steps of:

determining the strain for said sedimentary rock;

determining the effective stress for said sedimentary rock; and determining the unloading limb stress/strain relationship from said strain and said effective stress for said sedimentary rock.

4. The method of claim 3 wherein the step of determining the strain of said sedimentary rock comprises the relationship $(1.0-\phi)$, where $\phi$ is porosity for said sedimentary rock.

5. The method of claim 3 wherein the step of determining the strain of said sedimentary rock comprises the relationship $(\phi/1.0-\phi)$, where $\phi$ is porosity for said sedimentary rock.

6. The method of claim 3 wherein the step of determining the effective stress for said sedimentary rock comprises the steps of:

determining the overburden for said sedimentary rock at said first depth location of said borehole;

determining the pore pressure for said sedimentary rock at said first depth location of said borehole; and determining the effective pressure, for said sedimentary rock from said overburden and said pore pressure.

7. The method of claim 1 wherein the step of determining the loading limb stress/strain relationship further comprises the steps of:

determining the overburden of said sedimentary rock at said first depth location of said borehole;

determining the effective stress at each of a multiple of incremental depth locations of said borehole;

determining the solidity of said sedimentary rocks at each of said multiple of incremental depth locations of said borehole;

determining mineralogy of said sedimentary rocks; and determining said forced balanced stress/strain relationship for said loading limb.

8. The method of claim 7 wherein the step of determining the unloading limb stress/strain relationship further comprises the steps of:

determining the overburden of said sedimentary rock at said first depth of said borehole;

determining the effective stress at each of a multiple of incremental depth locations of said borehole;

determining the solidity of said sedimentary rocks at each of said multiple of incremental depth locations of said borehole;

determining mineralogy of said sedimentary rocks; and determining said forced balanced stress/strain relationship for said unloading limb.

9. The method of claim 8 wherein said forced balanced stress/strain relationship for said unloading limb is derived from local geologic conditions.

* * * * *